(12) United States Patent
Dolan et al.

(10) Patent No.: US 9,202,114 B2
(45) Date of Patent: Dec. 1, 2015

(54) METHOD AND SYSTEM FOR DETERMINING A THRESHOLD FOR SPIKE DETECTION OF ELECTROPHYSIOLOGICAL SIGNALS

(75) Inventors: Kevin T. Dolan, Eindhoven (NL); Hubert Cecile Francois Martens, Eindhoven (NL)

(73) Assignee: Medtronic Bakken Research Center B.V., Maastricht (NL)

( * ) Notice: Subject to any disclaimer, the term of this patent is extended or adjusted under 35 U.S.C. 154(b) by 1312 days.

(21) Appl. No.: 12/993,260

(22) PCT Filed: May 25, 2009

(86) PCT No.: PCT/IB2009/052176
§ 371 (c)(1), (2), (4) Date: Nov. 18, 2010

(87) PCT Pub. No.: WO2009/144655
PCT Pub. Date: Dec. 3, 2009

(65) Prior Publication Data
US 2011/0071766 A1    Mar. 24, 2011

(30) Foreign Application Priority Data

May 28, 2008  (EP) .................................... 08157068
Dec. 16, 2008 (EP) .................................... 08171804

(51) Int. Cl.
*G06F 19/00*   (2011.01)
*G06K 9/00*   (2006.01)

(52) U.S. Cl.
CPC .................................. *G06K 9/0053* (2013.01)

(58) Field of Classification Search
USPC ........ 702/19, 32, 66, 189, 193; 600/301, 544, 600/546
See application file for complete search history.

(56) References Cited

U.S. PATENT DOCUMENTS

| 4,154,238 | A | * | 5/1979 | Link | 600/494 |
| 4,603,703 | A | * | 8/1986 | McGill et al. | 600/544 |
| 5,601,091 | A | * | 2/1997 | Dolphin | 600/559 |
| 6,487,529 | B1 | | 11/2002 | Miet | |

(Continued)

FOREIGN PATENT DOCUMENTS

| JP | 48-037980 | 6/1973 |
| JP | 06-098865 | 4/1993 |

(Continued)

OTHER PUBLICATIONS

Decision to Grant dated Oct. 29, 2013, 3 pp. for Japanese Patent Application No. 2011-511139.

(Continued)

*Primary Examiner* — Mohamed Charioui
(74) *Attorney, Agent, or Firm* — Shumaker & Sieffert, P.A.

(57) ABSTRACT

A method is provided for determining a threshold (81, 82) for spike (12) detection in an electrophysiological signal (11). The method comprises a step of determining an estimated envelope (31) of the electrophysiological signal (11), a step of, based on the estimated envelope (31), determining an estimated Gaussian noise, a step of determining a distribution (51) of instantaneous amplitudes of the estimated Gaussian noise, a step of determining a mode (61) of the distribution (51) of instantaneous amplitudes, and determining the threshold (81, 82) based on the mode (61) of the distribution (51) of instantaneous amplitudes.

40 Claims, 11 Drawing Sheets

(56) References Cited

U.S. PATENT DOCUMENTS

| | | | |
|---|---|---|---|
| 7,231,194 B2 | 6/2007 | Vartiainen | |
| 2003/0105408 A1 | 6/2003 | Gotman et al. | |
| 2004/0230105 A1* | 11/2004 | Geva et al. | 600/301 |

FOREIGN PATENT DOCUMENTS

| | | |
|---|---|---|
| JP | 10-31435 | 12/1996 |
| JP | 2005-115345 | 4/2005 |
| JP | 2006-296509 | 11/2006 |
| WO | 2006003663 A2 | 1/2006 |

OTHER PUBLICATIONS

Ouiroga et al: "Unsupervised Spike Detection and Sorting With Wavelets and Superparamagnetic Clustering"; Neural Computation, 2004, vol. 16, pp. 1661-1687.

Yoo et al: "A Continuous-Time Speech Enhancement Front-End for Microphone Inputs"; Mobile and Media Systems, Hewlet Packard Company, 2002, 18 Page Document.

Kim et al: "Automatic Spike Detection Based on Adaptive Template Matching for Extracellular Neural Recordings", Journal of Neuroscience Methods, 2007. vol. 165, pp. 165-174.

Thakur et al : "Automated Optimal Detection and Classification of Neural Action Potentials in Extra-Cellular Recordings"; Journal Of-Neuroscience Methods, 2007, vol. 162, pp. 364-376.

Rogers et al: "An Analog VLSI Implementation of a Multi-Scale Spike Detection Algorithm for Extracellular Neural Recordings"; Proceedings of the 2nd International IEEE EMBS Conference on Neural Engineering, Arlington, Virginia, Mar. 2005, pp. V-VIII.

Chan et al: "Detection and Characterization of Neural. Spikes"; IEEE 3rd International Conference on Advances in Medical, Signal and Information Processing, (MEDSIP) 2006, pp. 1-4.

Watkins et al: "Validation of Adaptive Threshold Spike Detector for Neural Recording"; Proceedings of the 26th Annual International Conference of the IEEE EMBS, 12004, pp. 4079-4082.

Nenadic et al: "Spike Detection Using the Continuous Wavelet Transform", IEEE Transactions on Biomedical Engineering, Jan. 2005, vol. 52, No. 1, pp. 74-87.

Zhong-Sheng et al: "An Analysis of Various Methods for Computing the Envelope of a Random Signal"; Applied Ocean Research, 1995, vol. 17, pp. 9-19.

Ellis, et al., "A Continous-Time Speech Enhancement Front-End for Microphone Inputs." Mobile and Media Systems Laboratory HP, vol. 2, Nov. 7, 2002, pp. II-7284-II-731.

Nenadic, et al., "Spike Detection Using the Continuous Wavelet Transform," IEEE Transactions on Biomedical Engineering, vol. 52, No. 1, Jan. 2005, pp. 74-87.

International Search Report and Written Opinion from International Application No. PCT/IB2009/052176, dated Oct. 28, 2009, 16 pp.

International Preliminary Report on Patentability from International Application No. PCT/IB2009/052176, dated Nov. 30, 2010, 12 pp.

* cited by examiner

|  | Central | | | | Lateral | | | | Medial | | | | Anterior | | | | Posterior | | | |
|---|---|---|---|---|---|---|---|---|---|---|---|---|---|---|---|---|---|---|---|---|
|  | 8 Hz | 10 Hz | 32 Hz | 64 Hz | 8 Hz | 10 Hz | 32 Hz | 64 Hz | 8 Hz | 10 Hz | 32 Hz | 64 Hz | 8 Hz | 10 Hz | 32 Hz | 64 Hz | 8 Hz | 10 Hz | 32 Hz | 64 Hz |
| -6 |  |  |  |  |  |  |  |  |  |  |  |  |  | X |  |  |  |  |  |  |
|  | X |  |  |  |  |  |  |  |  |  |  |  |  |  |  |  |  |  |  |  |
|  |  |  |  |  | X |  |  |  |  |  |  |  |  |  |  |  |  |  |  |  |
|  |  |  |  |  |  |  |  |  |  |  |  |  |  |  |  |  |  |  |  |  |
| -4 | X |  |  |  |  |  |  |  |  |  |  |  |  |  |  |  | X |  |  |  |
|  |  |  |  |  |  |  |  |  | X |  |  |  |  |  |  |  |  |  |  |  |
|  |  |  |  |  |  |  |  |  |  |  |  |  |  |  |  |  |  |  |  |  |
|  |  |  |  |  | X |  |  |  |  |  | X |  |  |  |  |  | X |  |  |  |
| -2 |  | X |  |  |  |  |  |  |  |  | X |  |  |  |  |  |  |  |  |  |
|  |  | X | X |  |  |  |  |  |  |  | X |  |  |  |  |  |  |  |  |  |
|  |  | X |  |  |  |  |  |  | X | X |  |  | X |  |  |  |  |  |  |  |
|  | X |  | X |  |  |  |  |  |  |  | X |  |  |  |  |  |  |  |  | X |
| 0 |  | X |  |  |  |  |  |  | X |  | X |  |  |  |  |  |  |  |  |  |
|  | X | X |  |  |  |  |  |  |  |  |  |  |  |  |  |  |  |  |  |  |
|  | X | X | X |  |  | X |  |  |  |  |  |  |  |  |  |  |  |  |  |  |
|  |  |  | X |  |  |  |  |  |  |  |  | X |  |  |  |  |  |  |  |  |
| 2 | X |  |  |  |  |  |  |  |  |  |  | X |  |  |  |  |  |  |  |  |
|  |  |  |  | X |  |  |  |  |  |  |  |  |  |  |  |  |  |  |  |  |

Depth (mm)

FIG. 12

METHOD AND SYSTEM FOR DETERMINING A THRESHOLD FOR SPIKE DETECTION OF ELECTROPHYSIOLOGICAL SIGNALS

FIELD OF THE INVENTION

This invention relates to a method for determining a threshold for spike detection in an electrophysiological signal.

This invention further relates to a computer program product and a system for performing such a method.

BACKGROUND OF THE INVENTION

Electrophysiology generally involves placing electrodes into biological tissue of living organisms or into excised tissue. Common electrophysiological measurements are made in, e.g., brain or muscle tissue, but also other types of tissue may be subject to electrophysiological measuring. In the following, as an example, electrophysiological measurements in the brain are discussed. It is however to be noted that the described techniques are also applicable to other electrophysiological measurements.

A number of applications require a reliable method for detecting the activity of individual neurons. Examples include neural prostheses, where the activity of neurons in the cortex is measured and interpreted by a computer to control a prosthetic device. Another example would be functional neurosurgery, where recordings of neural activity are used to help refine the target location for surgical intervention. Additionally there are a number of research applications for which it is very important.

In order to measure activity from individual neurons, recordings are made with microelectrodes. A microelectrode is simply an electrode whose surface area is small enough to allow it to be selectively sensitive to only those neurons that are in its immediate vicinity. The activity of an individual neuron, as measured in this way, is typically a short, bipolar pulse called an action potential.

Microelectrode recordings typically consist of action potentials from a few nearby neurons (often referred to in the field as units), along with a strong noisy background. This background is a combination of averaged neural activity from large numbers of more distant neurons, and measurement noise due to, for example, impedance. As such, this background is typically broadband Gaussian noise.

The first steps to getting the activity of individual units are therefore to separate the action potentials from the background activity, and then separate the actions potentials into groups, where ideally each group represents a single unit. This process is called spike-sorting.

The very first step in spike-sorting is to find events in the data which are likely to represent an action potential. This is usually done by setting a threshold, and then defining the data in some interval immediately before and after any crossings of that threshold as an event. The background noise will occasionally cross the threshold due to chance, and the data may contain various artifacts that also cross the threshold. It is therefore extremely important that the threshold be optimally set for the data. The optimal setting being one for which a minimal number of action potentials are missed, and a minimal number of false-positives are found.

A critical step in setting the threshold for spike detection is to estimate the amplitude of the background noise. If one knows (or can assume) that the background noise is normally distributed, then one can set the threshold to a level such that false-positives due to random chance are very uncommon. Estimating the noise amplitude for microelectrode recordings can be a very tricky task, though. While the background noise itself is typically very accurately modeled as broad-band Gaussian noise, other activity such as action potentials and artifacts can also account for a large portion of the measured data, which makes the task of reliably estimating the noise distribution very difficult.

The most straight-forward way to estimate the noise amplitude is to measure the standard deviation of the overall signal. If the signal consists almost entirely of just noise, then this can be quite accurate. Unfortunately, the standard deviation is extremely sensitive to the presence of outliers. The standard deviation is especially sensitive to extreme outliers, meaning that if the action potentials or artifacts present in the signal have amplitudes much larger than the noise level, then even a small fraction of the data being contaminated can have a substantial effect on the standard deviation of the resulting signal.

A more robust method for estimating the noise-level is described in "Unsupervised Spike Detection and Sorting with Wavelets and Superparamagnetic Clustering" by Quian Quiroga, Nadasdy and Ben-Shaul (2004). This method uses the median of the absolute value of the signal, and divides it by a constant factor (0.6745). This method is based on the observation that for Gaussian noise, the median of the absolute value of the signal is proportional to the standard deviation of the signal. Generally speaking, the median of a distribution is far more robust to the presence of outliers than the standard deviation is, particularly when the outliers have much larger amplitudes than the noise. In fact, the median is not really sensitive to the amplitude of the outliers at all. The only factor that it is sensitive to is the fraction of the data that is contaminated.

In the case of zero mean Gaussian noise the median is also zero, and does not depend at all on the noise amplitude. Therefore, in the median estimation method of Quian Quiroga et al., the absolute value of the measured signal is used. The median estimate method performs much better than the method based on a direct measurement of the signal's standard deviation, especially for higher firing rates (frequency of occurrence of events in a simulated sample signal). However, even the improved estimate overestimates the noise amplitude by about 20% for a firing rate of 100 Hz.

OBJECT OF THE INVENTION

It is an object of the invention to provide a method for determining a threshold for spike detection in an electrophysiological signal, which method results in a more reliable threshold.

SUMMARY OF THE INVENTION

According to a first aspect of the invention, this object is achieved by providing a method for determining a threshold for spike detection in an electrophysiological signal, the method comprising the steps of determining an estimated envelope of the electrophysiological signal, based on the estimated envelope, determining an estimated Gaussian noise, determining a distribution of instantaneous amplitudes of the estimated Gaussian noise, determining a mode of the distribution of instantaneous amplitudes, and determining the threshold based on the mode of the distribution of instantaneous amplitudes.

The method according to the invention is based on the insight that the mode of the distribution of a signal tends to be quite robust to contamination by 'outliers'. This is particularly the case when the contamination has a dramatically different distribution than the original data (in this case the 'original data' is the background noise). This is of particular applicability here, where the data making up the spikes and/or artifacts often times lies mostly outside of the range of the background noise.

It is however useless to take the mode of the raw signal, because the mode of the raw signal is just zero, and like the median gives us no information about the amplitude of the noise. The absolute value of the signal is no good either, because its mode is also at the origin. The same is true for the raw data if rectified by squaring it, rather than by taking the absolute value. The inventors have overcome these problems by using the distribution of instantaneous amplitudes of the Gaussian noise as determined from the estimated envelope. The mode of this distribution of instantaneous amplitudes turns out to be a very good estimate of the standard deviation of the background noise in the signal.

A preferred embodiment of the method according to the invention applies a Hilbert filter of the raw signal to accurately determine the instantaneous amplitude. In another embodiment the distribution of instantaneous amplitudes is derived from a distribution of local extrema of the electrophysiological signal. The latter method is less accurate than the method using the Hilbert filter, but requires far less computational power, while still being quite robust to presence of exceptional events.

Curve fitting techniques may be used for determining the mode from the distribution of the instantaneous amplitudes.

These and other aspects of the invention are apparent from and will be elucidated with reference to the embodiments described hereinafter.

BRIEF DESCRIPTION OF THE DRAWINGS

In the drawings:

FIG. 12 shows a result of another statistical analysis of detected spikes.

DETAILED DESCRIPTION OF THE INVENTION

Figure 1A:
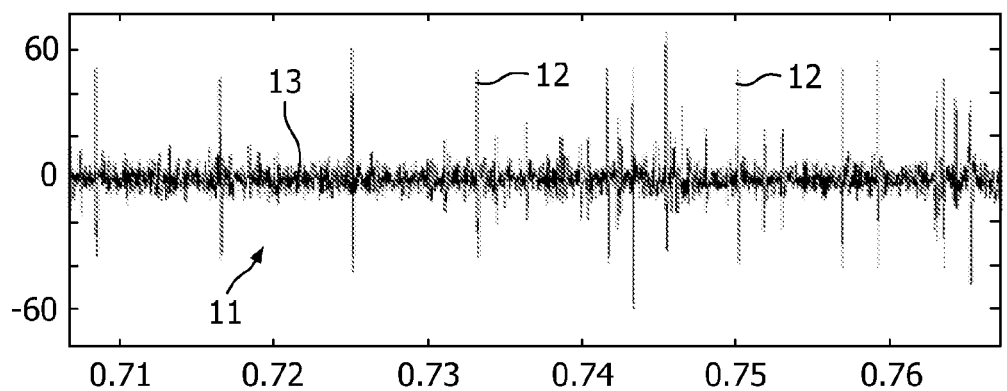
FIG. 1a shows an exemplary electrophysiological signal.
Figure 1B:
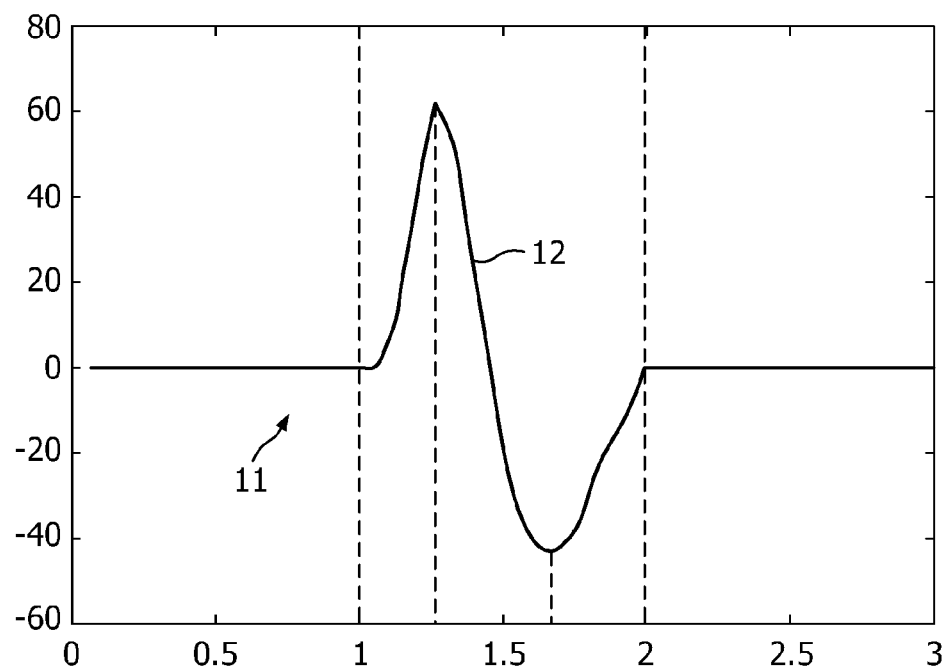
FIG. 1b shows an example of a spike as to be detected in the electrophysiological signal.

FIG. 1a shows an exemplary electrophysiological signal 11. The electrophysiological signal 11 comprises action potentials 12 from a few nearby neurons along with a noisy background 13. This background 13 is a combination of averaged neural activity from large numbers of more distant neurons, and measurement noise due to, for example, impedance. As such, this background 13 is typically broadband Gaussian noise. The activity of an individual neuron is typically a short, bipolar pulse (spike) called an action potential. FIG. 1b shows an example of a spike 12 as to be detected in the electrophysiological signal 11. The first step to getting the activity of individual units are to separate the action potentials 12 from the background activity 13. The separation of the action potentials 12 and the background noise 13 starts with finding events in the data which are likely to represent an action potential. This is usually done by setting a threshold, and then defining the data in some interval immediately before and after any crossings of that threshold as an event. Of course, not all events will be action potentials. The background noise 13 will occasionally cross the threshold due to chance, and the data may contain various artifacts that also cross the threshold. It is therefore extremely important that the threshold be optimally set for the data. The optimal setting being one for which a minimal number of action potentials 12 are missed, and a minimal number of false-positives are found.

Figure 2:
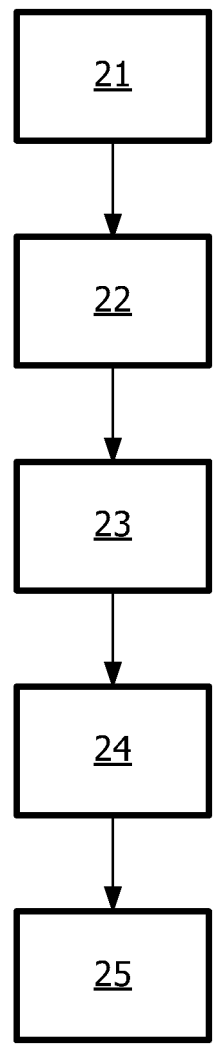
FIG. 2 shows a flow diagram of a method for determining a threshold for spike detection.

FIG. 2 shows a flow diagram of the method for determining the threshold for spike detection. According to the invention, the method starts with an envelope detection step 21 for determining an estimated envelope of the electrophysiological signal 11. The envelope of a signal 11 may be determined in various ways. For example, the signal 11 may be squared and sent through a low-pass filter. Alternatively, a Hilbert filter may be used for determining the envelope or local extrema may be determined for estimating the envelope. The latter two options will be further elucidated below with reference to FIGS. 3 and 4.

The estimated envelope is then used to determine an estimated Gaussian noise in noise estimating step 22. As no separation of spikes 12 and noise 13 has been attained yet, the estimated Gaussian noise will include action potentials 12, which are not part of the 'real' noise 13. Therefore, the method according to the invention uses statistical properties of the estimated Gaussian noise that are known to be highly robust to the presence of extreme events. The statistical properties used here, as an example, are the distribution of instantaneous amplitudes of the estimated Gaussian noise and the mode of said distribution.

In distribution determining step 23 the distribution of instantaneous amplitudes of the estimated Gaussian noise is determined. For example, a probability density function is constructed by making a histogram of the (absolute) values of the above mentioned local extrema (see FIG. 4), or by further processing the outcome of the Hilbert filter (see FIG. 3).

When a probability density function has been constructed the mode of the distribution is determined in mode detection step 24. This may be done directly from the distribution, for example, by taking the peak value of the function or the fullest bin of the histogram. Alternatively, the shape of the probability density function may be curve fitted to a predetermined function such as a parabola or a Rayleigh distribution, and the mode may then be computed by determining the peak of the fitted curve.

The threshold is then determined in threshold determination step 25. The selected threshold determines on the mode of the distribution (for a Rayleigh distribution, the mode is equal to the standard deviation of the distribution) and a desired confidence level. The confidence level is chosen such that an optimal balance is obtained between reducing the number of false positives and not missing too much real events.

Figure 3A:
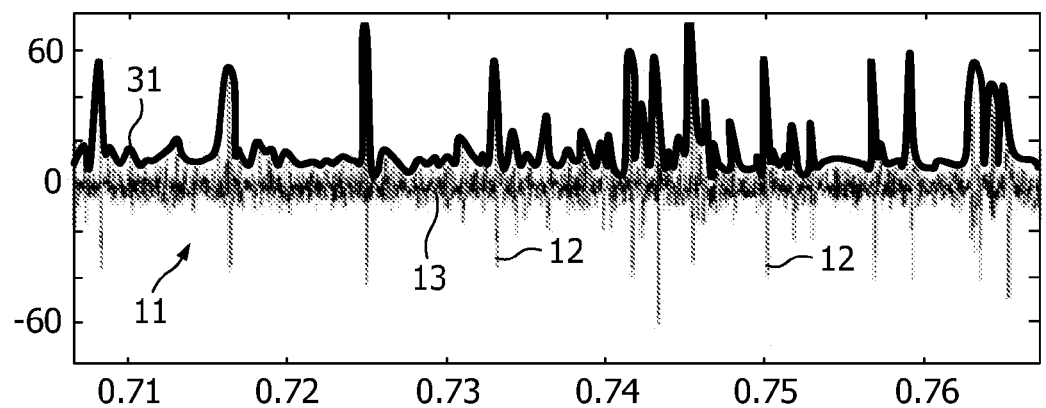
FIG. 3a shows the exemplary electrophysiological signal of FIG. 2a together with an estimated envelope of the electrophysiological signal.
Figure 3B:
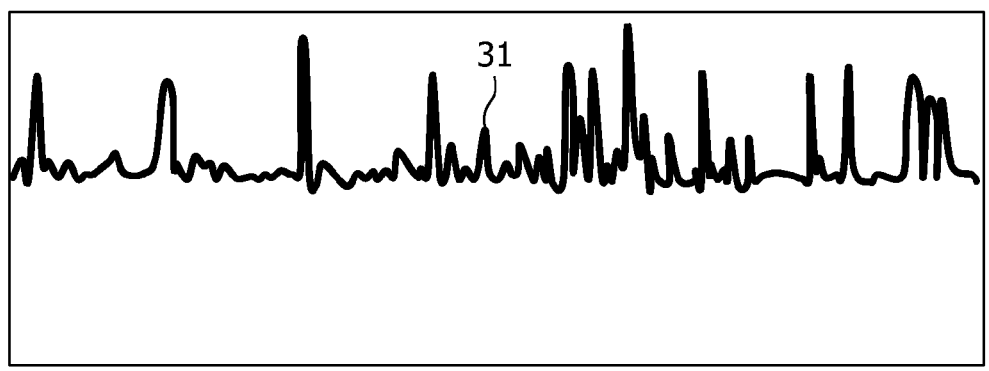
FIG. 3b shows the estimated envelope of the electrophysiological signal.

FIG. 3a shows the exemplary electrophysiological signal 11 of FIG. 2a together with an estimated envelope 31 of the electrophysiological signal 11. FIG. 3b only shows the estimated envelope 31 of the electrophysiological signal 11. The envelope 31 of the signal 11 may be determined in various ways. For example, the signal 11 may be squared and sent through a low-pass filter. Alternatively, a Hilbert filter may be used for determining the envelope 31, for example, in the following way:

First, the electrophysiological input signal X is demeaned (DC level subtracted) and/or band-limited, and then a Hilbert filter is applied. This filter produces a signal Z(t), such that Z(t)=X'(t)+iH(X'(t)), where X' is the demeaned signal, H(X') is the Hilbert transform of X', and i is the square-root of negative one. This analytic signal Z is then a complex function. When expressed in Polar form, Z(t)=A(t) exp(iθ(t)), where A is the instantaneous amplitude, and θ is the instantaneous phase. Both A and θ are a function of time (t). The Hilbert transform H(X'(t)) of the function X'(t) is given by the following formula:

$$H(X'(t)) = \int_{-\infty}^{\infty} \frac{X'(t-\tau)}{\pi\tau} d\tau$$

Figure 4:
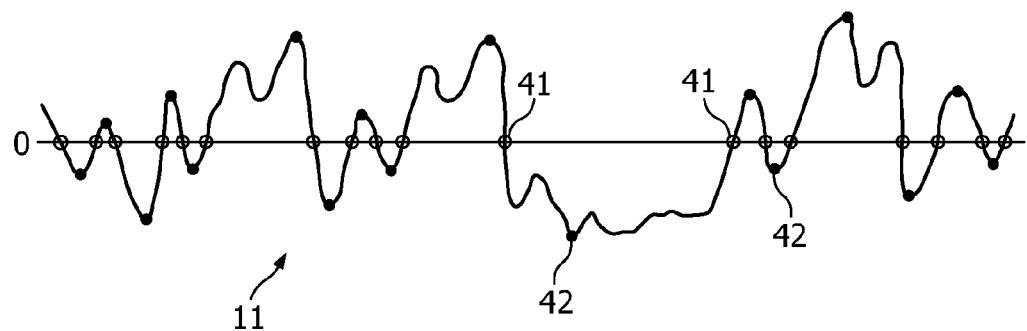
FIG. 4 illustrates a method for determining the estimated envelope.

FIG. 4 illustrates another method for determining the estimated envelope 31 of the Gaussian noise. Instead of directly computing the instantaneous amplitudes, it is approximately estimated as the values of local extrema 42. In this case, zero-crossings 41 of the demeaned signal X' 11 are located, and between each pair of zero-crossings 41 the local extremum 42 is determined and stored. The complete distribution of these extrema will be a rough approximation of the instantaneous amplitude distribution.

Figure 5:
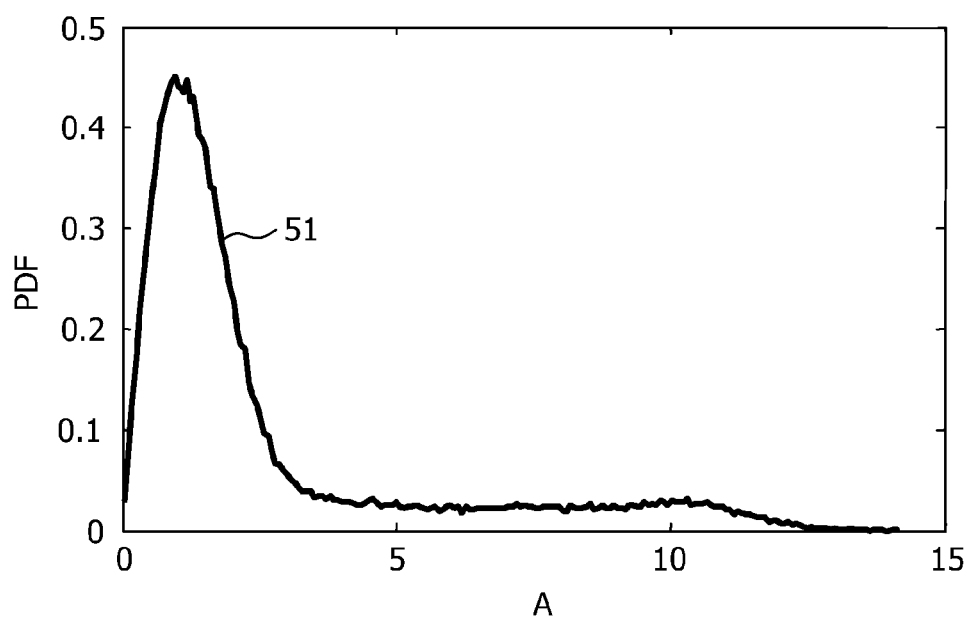
FIG. 5 shows a probability distribution function of the instantaneous amplitudes of the estimated Gaussian noise.

FIG. 5 shows a probability distribution function 51 of the instantaneous amplitudes of the estimated Gaussian noise. For example, the probability density function 51 is constructed by making a histogram of the (absolute) values of the local extrema (see FIG. 4), or by analyzing the function A(t) resulting from the Hilbert filter.

Figure 6:
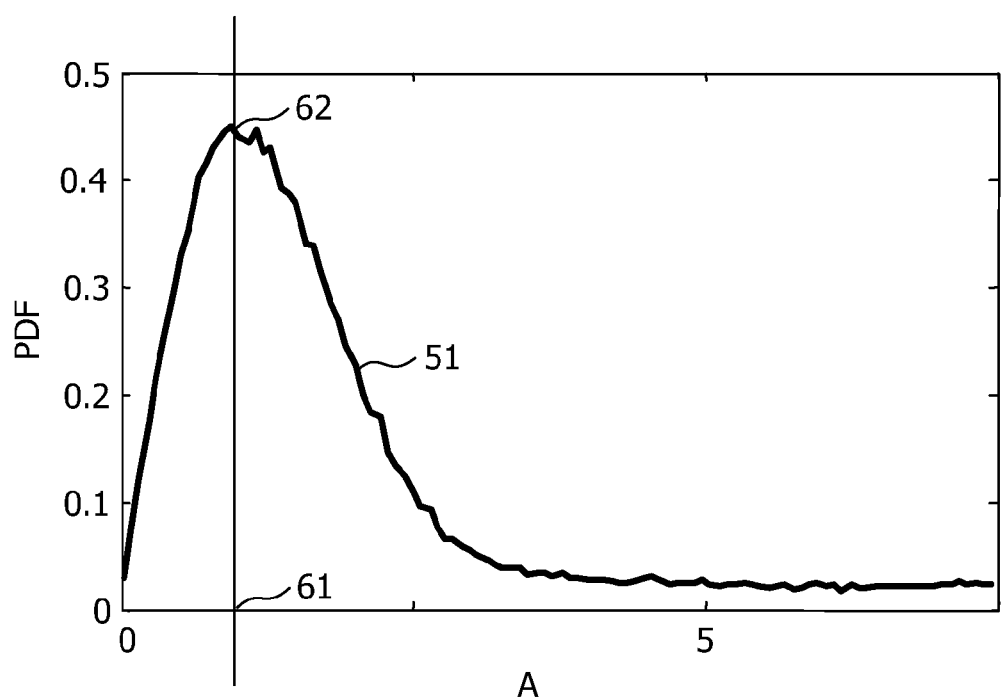
FIG. 6 shows how to determine the mode of the distribution of FIG. 5.

FIG. 6 shows how to determine the mode of the distribution of FIG. 5. The mode 61 simply is the value with the highest probability, i.e. the instantaneous amplitude at the peak 62 of the probability density function 51.

Figure 7:
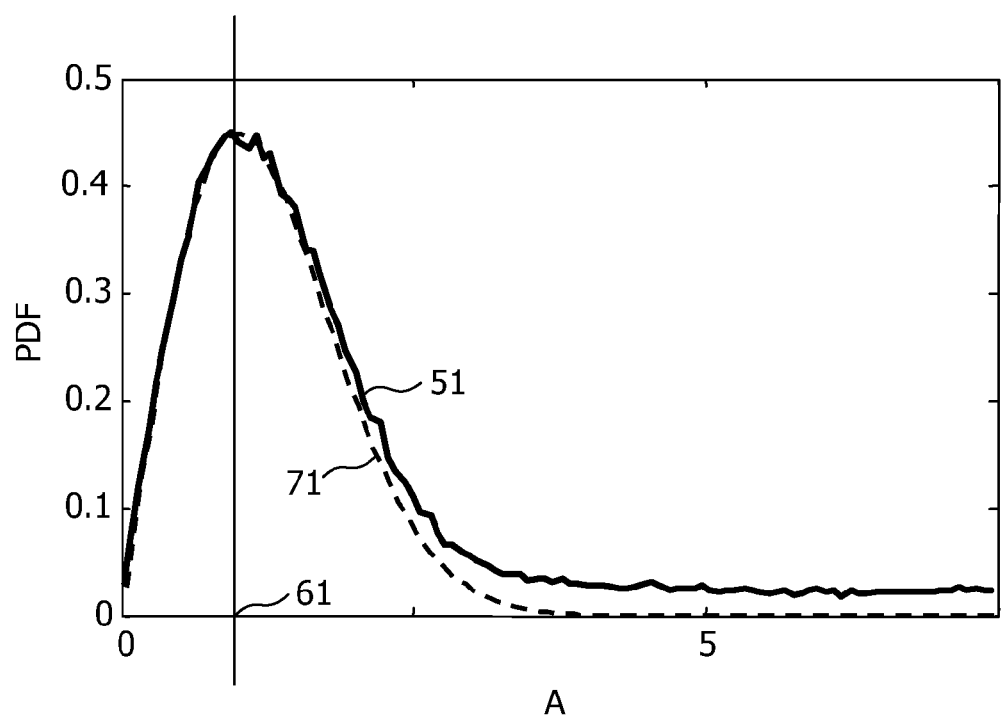
FIG. 7 illustrates an alternative way for determining the mode of the distribution of FIG. 5.

FIG. 7 illustrates an alternative and more accurate way for determining the mode of the distribution of FIG. 5. In addition to the mode 61 being very robust to the influences of exceptional events (spikes 12), the overall shape of the distribution 51 of the data in the region around the mode 61 tends to be quite robust to such events 12. By using a least-squares fit to match this data to the functional form of the Rayleigh distribution, a more reliable estimate of the variance of the background noise is then made by using the mode of the fit Rayleigh distribution:

$$P(x) = \frac{x}{\sigma^2} \exp\left(\frac{-x^2}{2\sigma^2}\right)$$

An important detail of the use of the Hilbert filter is that the Hilbert transform of a Gaussian signal is also Gaussian distributed. For band-limited Gaussian noise, these two distributions are statistically independent (Fang and Xie 1995). This means that the instantaneous amplitudes of the complex signal will be Rayleigh distributed. It is an advantage of the Rayleigh distribution 71 that its mode is equal to the standard deviation of the original Gaussian signal. Consequently, the mode 61 of the probability density function 51 is a direct measure for the variance of the noise distribution. Preferably, in order to reduce the influence of outliers (spikes), the distribution data in some narrow range around the mode 61 (for example, from 0.5 mode to 1.5 mode) is fitted to the functional form of the Rayleigh probability density function.

Alternatively, the region around the mode 61 may also be fitted to the curve of a parabola.

Figure 8:
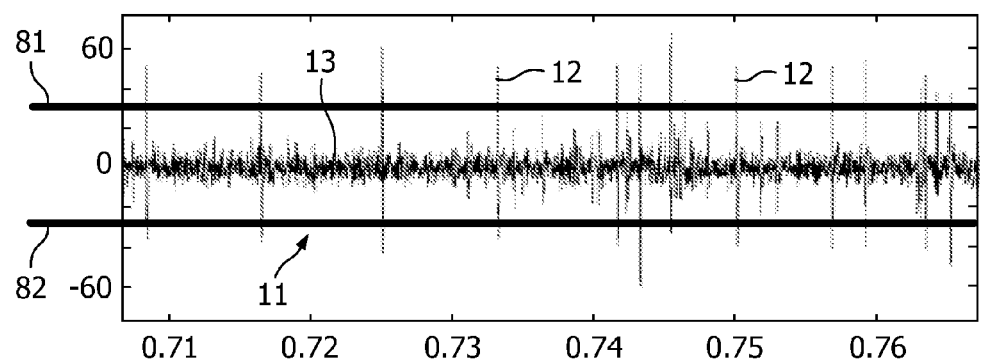
FIG. 8 shows the determined threshold applied to the electrophysiological signal.

FIG. 8 shows the determined threshold 81, 82 applied to the electrophysiological signal 11. The threshold 81, 82 is set to be a fixed multiple of the computed mode 61. The fixed multiple to use is set independently of the data, and is simply set to a value that corresponds to a confidence interval for the model Rayleigh distribution. For example, a threshold of 3.7 times the mode would correspond to the 99.9% confidence level for the Rayleigh distribution, which means that a detected event 12 has a probability of 0.99 of not being caused by background noise 13.

Once the threshold is set, any time the (demeaned) signal exceeds that threshold; it is marked as an event. This set of events is then passed on to the spike-sorting system. The threshold can be set in either the positive or negative direction, or both.

Figure 9A:
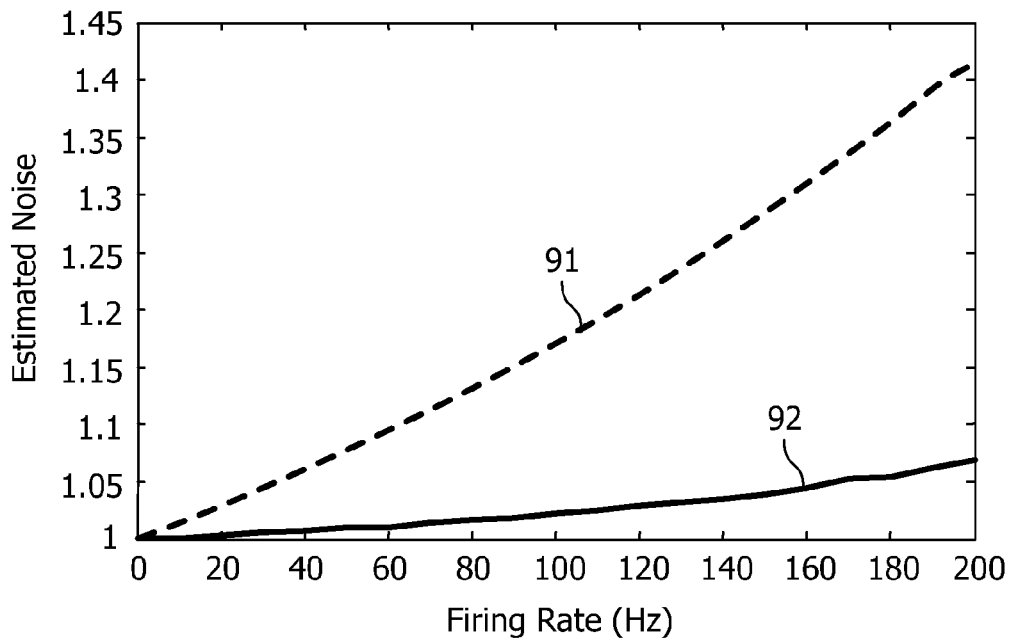
FIG. 9a and 9b show a comparison of the reliability of the results for the method according to the invention and the prior art method.

FIG. 9 shows a comparison of the reliability of the results for the method according to the invention and the prior art method. For both figures a simulation has been made of an electrophysiological signal with spikes and noise. The method according to the invention and the prior art 'median estimation' method (see above) have been used for making a noise estimation. FIG. 9a shows the estimated noise standard deviation as computed using both the median estimate (dashed line 91) and the mode of the amplitude distribution (solid line 92) for a signal consisting of background noise and super-imposed events. The actual noise standard deviation is 1.0. Each superimposed event was an action potential, sampled from an actual microelectrode recording. The action potential was scaled to have a duration of 2 ms, and an amplitude of 10. The action potentials were inserted at regular intervals, with the firing rate varying from 0 Hz (no action potential inserted) to 200 Hz. As can be seen in the figure, when using the method according to the invention, the noise estimate is much more accurate than when using the median estimation method of the prior art. Especially in the event of a high firing rate (many events), the method according to the invention outperforms the prior art method.

Figure 9B:
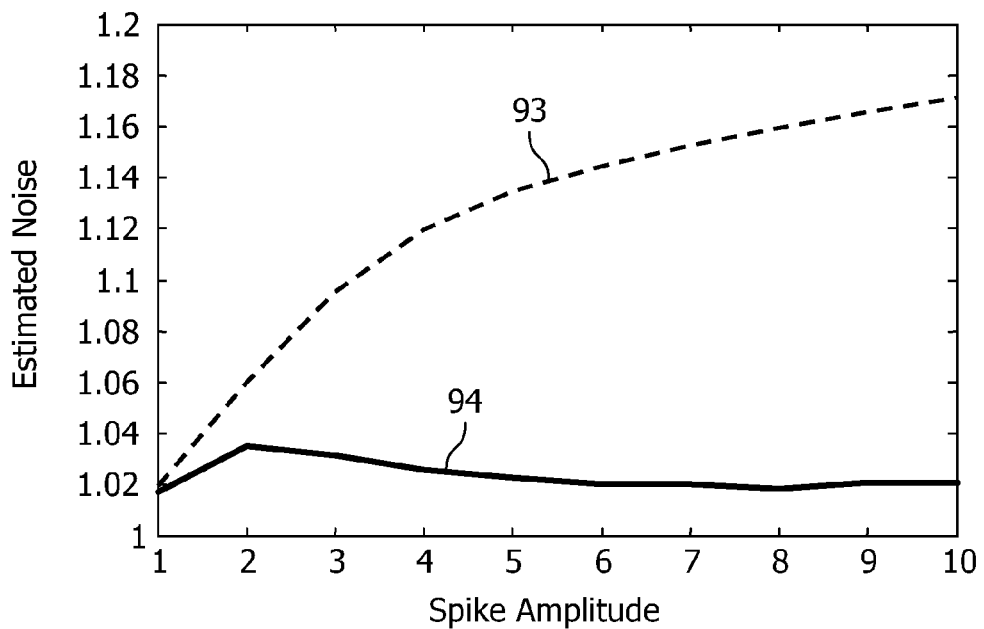

FIG. 9b shows the estimated noise standard deviation computed with the median method (dashed line 93) and the amplitude mode method (solid line 94). The noise used in the simulated electrophysiological signal was the same as described above for FIG. 9a. The spike amplitude was varied from 1 to 10, with bursting at a fixed rate of 10 Hz. As can be seen in the figure, when using the method according to the invention, the noise estimate is much more accurate than when using the median estimation method of the prior art.

Especially in the event of a larger spike amplitude, the method according to the invention outperforms the prior art method.

The method for determining a threshold as described above may be used as a starting point for further statistical analysis of the electrophysiological signals. Estimated noise levels and spike thresholds, determined with the method according to the invention, may provide information about the position of an electrode inside the human or animal body. According to the invention a system is provided for automatically computing and presenting to the user statistical information that is indicative of the functional anatomical role of the tissue being measured from, using the envelope-based noise-level estimation methodology according to the invention. When the separate components of the measured signal (e.g. background noise and spiking activity) are determined, statistics are computed on these individual components that are known to be correlated with various types of functional anatomy. The system then presents these statistics to the user as a function of position, thereby communicating to the user what the functional anatomy at each position is likely to be.

The system at least comprises an input for receiving electrophysiological signals and a processing unit configured to process the received signals. The processing unit is configured to determine an estimated envelope 31 of the electrophysiological signal 11 to determine an estimated Gaussian noise, based on the estimated envelope 31, to determine a distribution 51 of instantaneous amplitudes of the estimated Gaussian noise, to determine a mode 61 of the distribution 51 of instantaneous amplitudes, and to determine the threshold 81, 82 based on the mode 61 of the distribution 51 of instantaneous amplitudes. The system thus is capable of separating the signal into 'background noise' and 'spiking activity' components by using the envelope-based noise-level estimation method to automatically set an appropriate threshold. For the statistical analysis, the system may also comprise one or more component analysis subsystems, which compute statistical measures on the now separated components of the signal that are known to be correlated with different types of functional anatomy. A display subsystem may present the results of the analysis to the user as a function of position.

Figure 10:
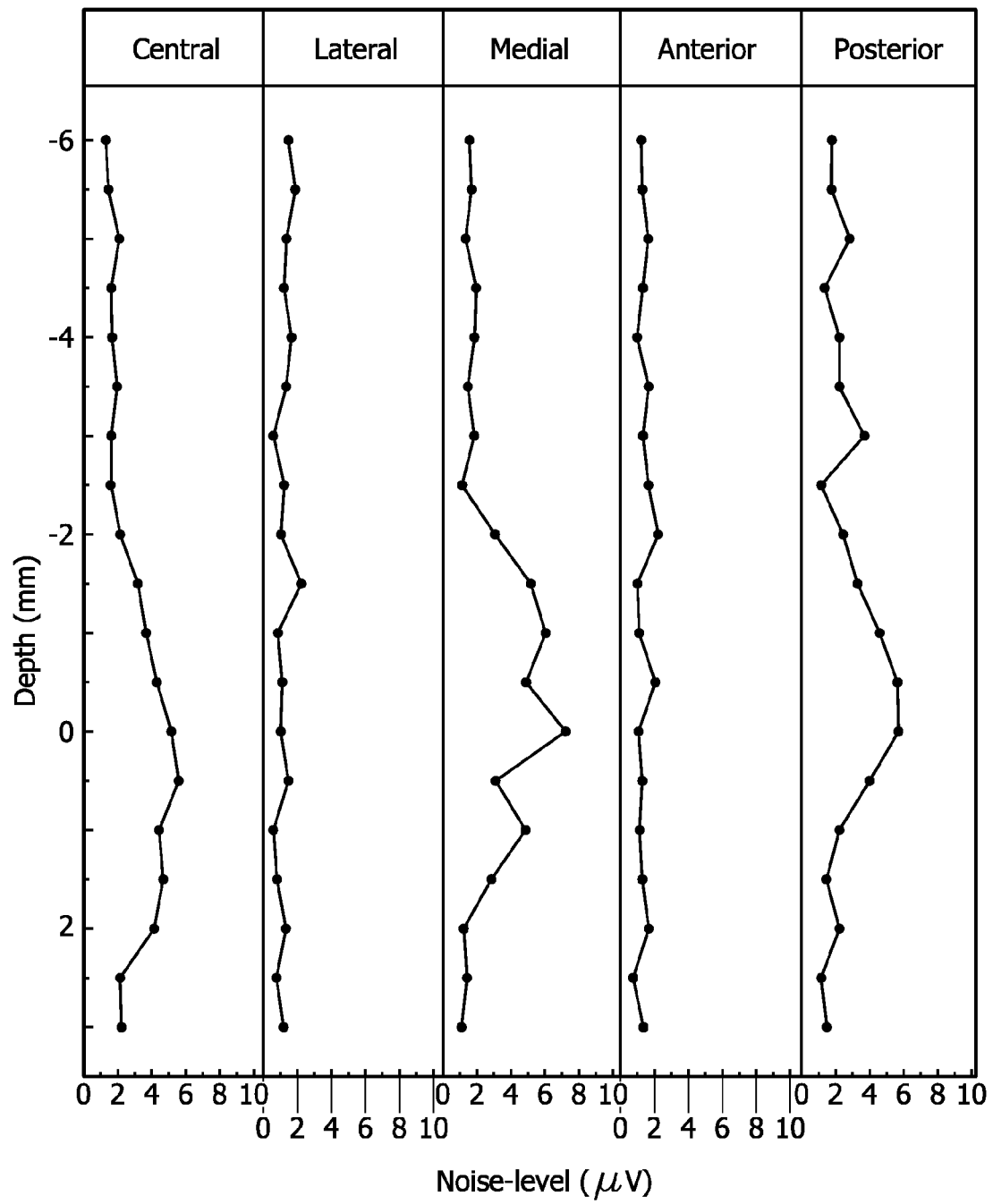
FIG. 10 shows a result of a statistical analysis of noise levels at different positions.

FIG. 10 shows a result of a statistical analysis of noise levels at different positions. In this example micro recordings are made along five parallel trajectories towards the target, at depths varying from several mm above to several mm below the initial estimated target position. For each recording, the background noise and spiking activity are separated using the methodology as described above. A summary diagram is then generated that displays the estimated noise-level as a function of depth and position. The noise-level itself is known to be a good indicator of being within, e.g., the Subthalamic Nucleus, which is a common target for stimulation in patients with Parkinson's disease. The increase and decrease of the noise-level as a function of depth can thus be used by the clinical team to determine when this target structure was entered and exited by each of the five microelectrode probes.

Figure 11:
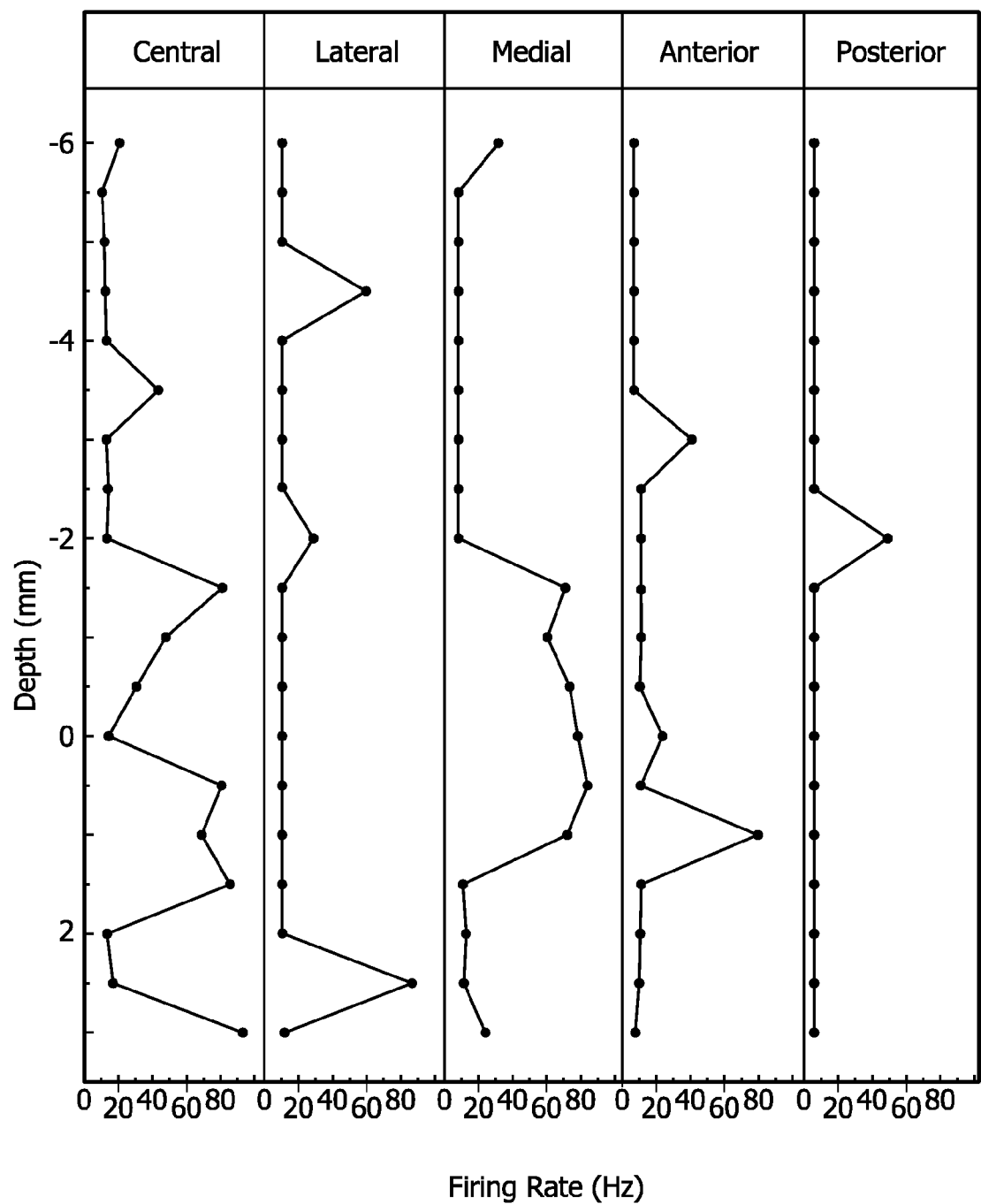
FIG. 11 shows a result of a statistical analysis of detected spikes.

FIG. 11 shows a result of a statistical analysis of detected spikes. This embodiment is similar to the embodiment of FIG. 10. In FIG. 11 the average rate of spikes within each recording is computed, and shown as a function of depth and position. Also this average firing rate may be a good indication of the position of an electrode relative to certain functional units in a human or animal brain or other part of the nervous system.

FIG. 12 shows a result of another statistical analysis of detected spikes. In this embodiment the surgical procedure is as in FIGS. 10 and 11. In this event, spike-sorting is performed on the spikes detected by the system. This separates the spiking events by neural unit, so that if more than one neuron is producing spikes in the signal, they can be separated into spiking events from distinct units. The range of possible firing-rates that can occur is then divided into predefined intervals based on knowledge of what firing-rates tend to be associated with anatomical regions of interest. The system then displays for the user, as a function of position and depth, which firing rates were present in each recording and provides information about the firing rates of each neural unit present in the measured physiological signal.

Figure 13:
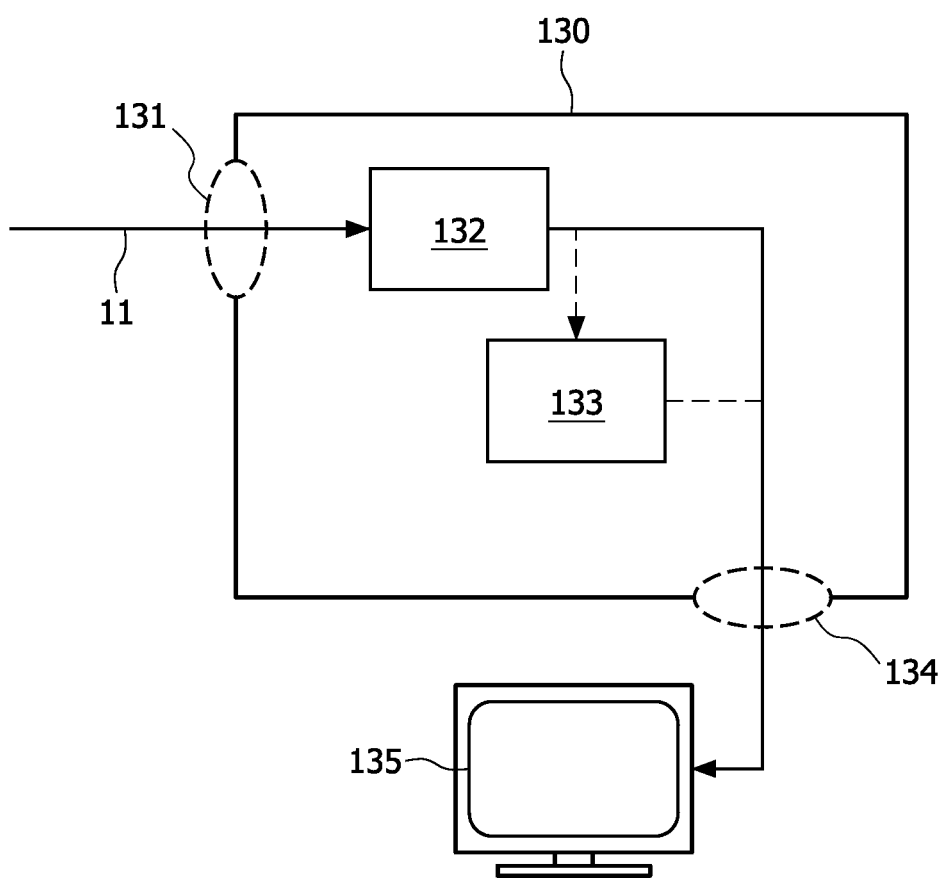
FIG. 13 shows a system for determining a spike threshold according to the invention.

FIG. 13 shows a system 130 for determining a spike threshold. The system 130 comprises an input 131 for receiving the electrophysiological signal 11 and a processing unit 132 for processing the electrophysiological signal 11. The processing unit 132 is configured to determine an estimated envelope 31 of the electrophysiological signal 11, based on the estimated envelope 31, determine an estimated Gaussian noise, determine a mode 61 of the distribution 51 of the estimated envelope 31, and determine the threshold 81, 82 based on the mode 61 of the distribution 51 of the estimated envelope 31. The system 130 may also comprise an output 134 for presenting to the user, a result of the processing of the electrophysiological signal 11. The output may be coupled to a display 135 for displaying the results.

Optionally the system 130 further comprises a component analysis subsystem 133 for performing a statistical analysis on the measured electrophysiological signals based on the estimated Gaussian noise and/or on the threshold of one or more electrophysiological signals measured at different positions. A statistical analysis as a function of the one or more different positions may be provided at the output 134 and displayed on the display 135.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for determining a threshold for spike detection in an electrophysiological signal, the method comprising:
   receiving, at an input of a system for determining a threshold for spike detection, an electrophysiological signal comprising one or more spikes representing action potentials from one or more neurons;
   determining, in a processing unit of the system, an estimated envelope of the electrophysiological signal;
   based on the estimated envelop; determining, in the processing unit of the system, an estimated Gaussian noise;
   determining, in the processing unit of the system, a mode of a distribution of the estimated Gaussian noise; and
   determining, in the processing unit of the system, a threshold for detection of the one or more spikes in the electrophysiological signal based on the mode of the distribution of the estimated Gaussian noise.

2. A method for determining a threshold as claimed in claim 1, wherein determining the mode of the distribution of the estimated Gaussian noise comprises:
   determining a distribution of instantaneous amplitudes of the estimated Gaussian noise; and determining a mode of the distribution of the instantaneous amplitudes of the estimated Gaussian noise.

3. A method for determining a threshold as claimed in claim 2, wherein determining the estimated envelope of the electrophysiological signal comprises computing an analytic signal, the analytic signal comprising a real part and an imaginary part, the real part comprising the electrophysiological signal, the imaginary part comprising a Hilbert transform of the electrophysiological signal, and
   wherein the distribution of instantaneous amplitudes of the estimated Gaussian noise is derived from the analytic signal.

4. A method for determining a threshold as claimed in claim 2, wherein determining the estimated envelope of the electrophysiological signal comprises determining local extrema of the electrophysiological signal, and wherein the distribution of the instantaneous amplitudes of the estimated Gaussian noise is derived from a distribution of the local extrema.

5. A method for determining a threshold as claimed in claim 2, wherein the threshold is determined to be a fixed multiple of mode of the distribution of instantaneous amplitudes of the estimated Gaussian noise.

6. A method for determining a threshold as claimed in claim 2, wherein determining the threshold based on the mode of the distribution of the estimated Gaussian noise comprises fitting a smooth curve to a shape of the distribution of the instantaneous amplitudes of the estimated Gaussian noise over an interval around the mode.

7. A method for determining a threshold as claimed in claim 1, wherein the distribution of the estimated Gaussian noise is a smooth curve, and wherein the smooth curve comprises a parabola.

8. A method for determining a threshold as claimed in claim 1, wherein the distribution of the estimated Gaussian noise is a smooth curve, and wherein the smooth curve comprises a Rayleigh distribution.

9. A method for determining a threshold as claimed in claim 1, further comprising detecting one or more of the spikes in the electrophysiological signal based on the threshold.

10. A method for presenting a statistical analysis of electrophysiological signals, the method comprising:
    measuring an electrophysiological signal received at an input of a system for determining a threshold for spike detection and comprising one or more spikes representing action potentials from one or more neurons at one or more positions;
    determining, in a processing unit of the system, an estimated envelope of each of the measured electrophysiological signals;
    determining, in the processing unit of the system, an estimated Gaussian noise of each of the measured electrophysiological signals based on the estimated envelope;
    determining, in the processing unit of the system, a mode of a distribution of the estimated Gaussian noise of each of the measured electrophysiological signals;
    determining, in the processing unit of the system, a threshold of each of the measured electrophysiological signals based on the mode of the distribution of the estimated Gaussian noise;
    performing a statistical analysis, in the processing unit of the system, on the measured electrophysiological signals based on at least one of the estimated Gaussian noise or the threshold of the measured electrophysiological signals; and
    presenting to a user a result of the statistical analysis.

11. A method for presenting a statistical analysis of electrophysiological signals as claimed in claim 10, wherein the statistical analysis further comprises determining an average rate of the spikes at each one of the one or more positions.

12. A method for presenting a statistical analysis of electrophysiological signals as claimed in claim 10, wherein presenting to the user the result of the statistical analysis comprises presenting the estimated Gaussian noise.

13. A method for presenting a statistical analysis of electrophysiological signals as claimed in claim 10, wherein the statistical analysis further comprises sorting the spikes based on an analysis of firing rates present in the measured electrophysiological signals.

14. A method for presenting a statistical analysis of electrophysiological signals as claimed in claim 10, further comprising detecting one or more of the spikes in the electrophysiological signal based on the threshold.

15. A method for presenting a statistical analysis of electrophysiological signals as claimed in claim 10, wherein determining the mode of the distribution of the estimated Gaussian noise comprises:
   determining a distribution of instantaneous amplitudes of the estimated Gaussian noise; and
   determining a mode of the distribution of the instantaneous amplitudes of the estimated Gaussian noise.

16. A method for presenting a statistical analysis of electrophysiological signals as claimed in claim 15, wherein determining the estimated envelope of the electrophysiological signal comprises computing an analytic signal, the analytic signal comprising a real part and an imaginary part, the real part comprising the electrophysiological signal, the imaginary part comprising a Hilbert transform of the electrophysiological signal, and
   wherein the distribution of instantaneous amplitudes of the estimated Gaussian noise is derived from the analytic signal.

17. A method for presenting a statistical analysis of electrophysiological signals as claimed in claim 15, wherein determining the estimated envelope of the electrophysiological signal comprises determining local extrema of the electrophysiological signal, and wherein the distribution of the instantaneous amplitudes of the estimated Gaussian noise is derived from a distribution of the local extrema.

18. A method for presenting a statistical analysis of electrophysiological signals as claimed in claim 15, wherein the threshold is determined to be a fixed multiple of mode of the distribution of instantaneous amplitudes of the estimated Gaussian noise.

19. A method for presenting a statistical analysis of electrophysiological signals as claimed in claim 15, wherein determining the threshold based on the mode of the distribution of the estimated Gaussian noise comprises fitting a smooth curve to a shape of the distribution of the instantaneous amplitudes of the estimated Gaussian noise over an interval around the mode.

20. A method for presenting a statistical analysis of electrophysiological signals as claimed in claim 10, wherein the distribution of the estimated Gaussian noise is a smooth curve, and wherein the smooth curve comprises a parabola.

21. A method for presenting a statistical analysis of electrophysiological signals as claimed in claim 10, wherein the distribution of the estimated Gaussian noise is a smooth curve, and wherein the smooth curve comprises a Rayleigh distribution.

22. A non-transitory computer readable storage medium comprising instructions that cause a processing unit of a system for determining a threshold for spike detection to:
   determine an estimated envelope of an electrophysiological signal comprising spikes representing action potentials from one or more neurons;
   based on the estimated envelope, determine an estimated Gaussian noise;
   determine a mode of a distribution of the estimated Gaussian noise; and
   determine the threshold based on the mode of a distribution of the estimated Gaussian noise.

23. A non-transitory computer readable storage medium as claimed in claim 22, further comprising instructions that cause the processing unit of the system for determining the threshold for spike detection to detect one or more of the spikes in the electrophysiological signal based on the threshold for spike detection.

24. A non-transitory computer readable storage medium as claimed in claim 22, wherein the instructions that cause the processing unit of the system for determining the threshold for spike detection to determine the mode of the distribution of the estimated Gaussian noise comprises instructions that cause the processing unit of the system for determining the threshold for spike detection to:
   determine a distribution of instantaneous amplitudes of the estimated Gaussian noise; and
   determine a mode of the distribution of the instantaneous amplitudes of the estimated Gaussian noise.

25. A non-transitory computer readable storage medium as claimed in claim 24, wherein the instructions that cause the processing unit of the system for determining the threshold for spike detection to determine the estimated envelope of the electrophysiological signal comprises instructions that cause the processing unit of the system for determining the threshold for spike detection to compute an analytic signal, the analytic signal comprising a real part and an imaginary part, the real part comprising the electrophysiological signal, the imaginary part comprising a Hilbert transform of the electrophysiological signal, and
   wherein the distribution of instantaneous amplitudes of the estimated Gaussian noise is derived from the analytic signal.

26. A non-transitory computer readable storage medium as claimed in claim 24, wherein the instructions that cause the processing unit of the system for determining the threshold for spike detection to determine the estimated envelope of the electrophysiological signal comprises instructions that cause the processing unit of the system for determining the threshold for spike detection to determine local extrema of the electrophysiological signal, and wherein the distribution of the instantaneous amplitudes of the estimated Gaussian noise is derived from a distribution of the local extrema.

27. A non-transitory computer readable storage medium as claimed in claim 24, wherein the threshold is determined to be a fixed multiple of mode of the distribution of instantaneous amplitudes of the estimated Gaussian noise.

28. A non-transitory computer readable storage medium as claimed in claim 24, wherein the instructions that cause the processing unit of the system for determining the threshold for spike detection to determine the threshold based on the mode of the distribution of the estimated Gaussian noise comprises instructions that cause the processing unit of the system for determining the threshold for spike detection to fit a smooth curve to a shape of the distribution of the instantaneous amplitudes of the estimated Gaussian noise over an interval around the mode.

29. A non-transitory computer readable storage medium as claimed in claim 22, wherein the distribution of the estimated Gaussian noise is a smooth curve, wherein the smooth curve comprises a parabola.

30. A non-transitory computer readable storage medium as claimed in claim 22, wherein the distribution of the estimated Gaussian noise is a smooth curve, wherein the smooth curve comprises a Rayleigh distribution.

31. A system for determining a threshold for spike detection in an electrophysiological signal, the system comprising:

an input for receiving the electrophysiological signal comprising spikes representing action potentials from one or more neurons; and a processing unit configured to:
- determine an estimated envelope of the electrophysiological signal,
- based on the estimated envelop; determine an estimated Gaussian noise,
- determine a mode of the distribution of the estimated Gaussian noise, and
- determine the threshold based on the mode of the distribution of the estimated Gaussian noise.

32. A system for determining a threshold as claimed in claim 31, further comprising:
- a component analysis subsystem for performing a statistical analysis on the received electrophysiological signals based on at least one of the estimated Gaussian noise or the threshold of one or more electrophysiological signals measured at different position; and
- an output for presenting to a user, a result of the statistical analysis as a function of the different positions.

33. A system for determining a threshold as claimed in claim 31, wherein the processing unit is further configured to detect one or more of the spikes in the electrophysiological signal based on the threshold.

34. A system for determining a threshold as claimed in claim 31, wherein the processing unit configured to determine the mode of the distribution of the estimated Gaussian noise comprises the processing unit configured to:
- determine a distribution of instantaneous amplitudes of the estimated Gaussian noise; and
- determine a mode of the distribution of the instantaneous amplitudes of the estimated Gaussian noise.

35. A system for determining a threshold as claimed in claim 34, wherein the processing unit configured to determine the estimated envelope of the electrophysiological signal comprises the processing unit configured to compute an analytic signal, the analytic signal comprising a real part and an imaginary part, the real part comprising the electrophysiological signal, the imaginary part comprising a Hilbert transform of the electrophysiological signal, and
- wherein the distribution of instantaneous amplitudes of the estimated Gaussian noise is derived from the analytic signal.

36. A system for determining a threshold as claimed in claim 34, wherein the processing unit configured to determine the estimated envelope of the electrophysiological signal comprises the processing unit configured to determine local extrema of the electrophysiological signal, and wherein the distribution of the instantaneous amplitudes of the estimated Gaussian noise is derived from a distribution of the local extrema.

37. A system for determining a threshold as claimed in claim 34, wherein the threshold is determined to be a fixed multiple of mode of the distribution of instantaneous amplitudes of the estimated Gaussian noise.

38. A system for determining a threshold as claimed in claim 34, wherein the processing unit configured to determine the threshold based on the mode of the distribution of the estimated Gaussian noise comprises the processing unit configured to fit a smooth curve to a shape of the distribution of the instantaneous amplitudes of the estimated Gaussian noise over an interval around the mode.

39. A system for determining a threshold as claimed in claim 31, wherein the distribution of the estimated Gaussian noise is a smooth curve, and wherein the smooth curve comprises a parabola.

40. A system for determining a threshold as claimed in claim 31, wherein the distribution of the estimated Gaussian noise is a smooth curve, and wherein the smooth curve comprises a Rayleigh distribution.

* * * * *

UNITED STATES PATENT AND TRADEMARK OFFICE
CERTIFICATE OF CORRECTION

| | | |
|---|---|---|
| PATENT NO. | : 9,202,114 B2 | Page 1 of 1 |
| APPLICATION NO. | : 12/993260 | |
| DATED | : December 1, 2015 | |
| INVENTOR(S) | : Dolan et al. | |

It is certified that error appears in the above-identified patent and that said Letters Patent is hereby corrected as shown below:

In the claims

Col. 9, Line 42: "based on the estimated envelop;" should read --based on the estimated envelope;--

Col. 13, Line 19: "measured at different position;" should read --measured at different positions--

Signed and Sealed this
Twelfth Day of April, 2016

Michelle K. Lee
*Director of the United States Patent and Trademark Office*